(12) United States Patent
Arikawa et al.

(10) Patent No.: US 10,907,657 B2
(45) Date of Patent: Feb. 2, 2021

(54) ACCUMULATOR (71) Applicant: Eagle Industry Co., Ltd., Tokyo (JP)

(72) Inventors: Tatsuhiro Arikawa, Tokyo (JP); Matsuyoshi Yamashita, Tokyo (JP)

(73) Assignee: EAGLE INDUSTRY CO., LTD.

( * ) Notice: Subject to any disclaimer, the term of this patent is extended or adjusted under 35 U.S.C. 154(b) by 32 days.

(21) Appl. No.: 16/464,650

(22) PCT Filed: Nov. 10, 2017

(86) PCT No.: PCT/JP2017/040545
§ 371 (c)(1),
(2) Date: May 28, 2019

(87) PCT Pub. No.: WO2018/101007
PCT Pub. Date: Jun. 7, 2018

(65) Prior Publication Data
US 2019/0383309 A1 Dec. 19, 2019

(30) Foreign Application Priority Data

Dec. 2, 2016 (JP) .................................. 2016-235343

(51) Int. Cl.
*F16L 55/04* (2006.01)
*F15B 1/10* (2006.01)

(52) U.S. Cl.
CPC ........ *F15B 1/103* (2013.01); *F15B 2201/205* (2013.01); *F15B 2201/3153* (2013.01)

(58) Field of Classification Search
CPC .......................... F15B 1/103; F15B 2201/3153
(Continued)

(56) References Cited

U.S. PATENT DOCUMENTS

| 781,939 A | * | 2/1905 | Fulton | .................... B65D 88/02 |
| | | | | 220/565 |
| 3,038,553 A | * | 6/1962 | Peters | ................. F16L 55/0337 |
| | | | | 181/271 |

(Continued)

FOREIGN PATENT DOCUMENTS

| CN | 1178171 | 4/1998 | ................ F16B 1/10 |
| CN | 103842661 A | 6/2014 | ................ F15B 1/08 |

(Continued)

OTHER PUBLICATIONS

Chinese Office Action (w/translation) issued in application No. 201780073091.3, dated Nov. 29, 2019 (9 pgs).

(Continued)

*Primary Examiner* — James F Hook
(74) *Attorney, Agent, or Firm* — Hayes Soloway P.C.

(57) ABSTRACT

An accumulator includes a bellows 3 having a plurality of outer ridge portions and a plurality of inner annular ridge portions and configured to be capable of expanding and contracting, and a housing having a fluid supply port and fixed to one end of the bellows serving as a fixed end. An interior of the housing is partitioned in a sealed state into an inside and an outside of the bellows. The outer annular ridge portions are divided into at least a first sector and a second sector which are distributed in an expansion and contraction direction of the bellows such that the second sector is positioned between the first sector and the fixed end. The outer annular ridge portions included in the first sector have an outer diameter smaller than an outer diameter of the outer annular ridge portions included in the second sector.

5 Claims, 11 Drawing Sheets

(58) Field of Classification Search
USPC .................................................... 138/30, 31
See application file for complete search history.

(56) References Cited

U.S. PATENT DOCUMENTS

| | | | | |
|---|---|---|---|---|
| 3,620,557 | A * | 11/1971 | Gustav ..................... | B64G 1/40 |
| | | | | 285/228 |
| 4,213,545 | A * | 7/1980 | Thompson ........... | B67D 1/0462 |
| | | | | 138/30 |
| 4,508,373 | A * | 4/1985 | Ward ..................... | F16L 27/02 |
| | | | | 285/226 |
| 4,585,913 | A * | 4/1986 | Yorita ..................... | F16J 3/048 |
| | | | | 138/121 |
| 6,405,760 | B1 * | 6/2002 | Tranter .................. | B60T 7/042 |
| | | | | 138/30 |
| 7,318,452 | B2 | 1/2008 | Yoshihara et al. .............. | 138/30 |
| 9,027,600 | B2 | 5/2015 | Yamashita .............. | F16L 55/04 |
| 9,328,746 | B2 | 5/2016 | Hyodo et al. ........... | F15B 1/103 |
| 9,683,583 | B2 | 6/2017 | Arikawa ................. | F15B 1/103 |
| 2013/0167962 | A1 * | 7/2013 | Skjetne .............. | E21B 41/0007 |
| | | | | 138/30 |
| 2018/0087665 | A1 | 3/2018 | Endo et al. .............. | F16J 3/047 |

FOREIGN PATENT DOCUMENTS

| | | | |
|---|---|---|---|
| CN | 104583606 | 4/2015 | ................ F15B 1/08 |
| CN | 105247255 | 1/2016 | ................ F15B 1/02 |
| DE | 2910554 | 9/1980 | ................ F15B 1/10 |
| DE | 3807316 | 4/1989 | ................ F15B 1/10 |
| JP | 2-101102 | 8/1990 | ................ F15B 1/10 |
| JP | 2007092782 | 4/2007 | ................ F15B 1/08 |
| JP | 2012167748 | 9/2012 | ................ F15B 1/08 |
| WO | WO2005052381 | 6/2005 | ................ F15B 1/08 |
| WO | WO2016194607 | 12/2016 | ................ F16J 3/04 |

OTHER PUBLICATIONS

International Search Report and Written Opinion issued (w/translations) in application No. PCT/JP2017/040545, dated Feb. 6, 2018 (12 pgs).

International Preliminary Report on Patentability (w/translation) issued in application No. PCT/JP2017/040545, dated Jun. 4, 2019 (7 pgs).

European Search Report issued in application No. 17875106.1, dated May 28, 2020 (8 pgs).

Chinese Office Action issued in application No. 201780073091.3, with translation, dated Jul. 13, 2020 (12 pgs).

* cited by examiner

Fig.11

ACCUMULATOR

TECHNICAL FIELD

The present invention relates to an accumulator used as a pressure accumulation device, a pulsation damping device or the like in a hydraulic system for motor vehicle, a hydraulic system for industrial equipment or the like.

BACKGROUND ART

In a hydraulic circuit of a hydraulic control device for motor vehicle, industrial equipment or the like, an accumulator for pressure accumulation, pulsation damping (buffering) and the like is provided. In such an accumulator, a bellows is arranged in a housing, the bellows is composed of a bellows body whose fixed end is welded and fixed to the housing and a bellows cap attached to the other end of the bellows body, and by the bellows body and the bellows cap, an interior space of the housing is partitioned in a sealed state into a gas chamber in which gas is enclosed and a fluid chamber communicating with an oil port connected to a hydraulic circuit. The bellows body has a repetitive structure of outer annular ridge portions and inner annular ridge portions by continuously forming ridge-folds and valley-folds in an up and down direction from a metallic film or plate material, the bellows body expands and contracts when the bellows cap moves such that gas pressure in the gas chamber and liquid pressure in the liquid chamber are balanced, and thereby performing a pressure accumulation operation, a pulsation damping operation, or the like (see, Patent Citation 1).

CITATION LIST

Patent Literature

Patent Citation 1, JP 2012-167748 A (Page 4, FIG. 1)

SUMMARY OF INVENTION

Technical Problem

However, in Patent Citation 1, there was a problem in that the bellows body has the repetitive structure of a plurality of the outer annular ridge portions and a plurality of the inner annular ridge portions, and is capable of expanding and contracting by bending and deforming the outer annular ridge portions and the inner annular ridge portions, so the bellows easily vibrates even against external vibration, and a sector where amplitude of vibration away from the fixed end in an expansion and contraction direction of the bellows is increased may abut on an inner wall of the housing, thereby reducing the durability of the bellows.

The present invention has been made in view of such a problem, and an object thereof is to provide an accumulator in which a service life of the bellows is prolonged.

Solution to Problem

In order to solve the problem, an accumulator according to a first aspect of the present invention comprising a bellows having a plurality of outer annular ridge portions and a plurality of inner annular ridge portions and configured to be capable of expanding and contracting, and a housing having a fluid supply port and foxed to one end of the bellows serving as a fixed end, an interior of the housing being partitioned in a sealed state into an inside and an outside of the bellows, the accumulator is characterized in that:

the outer annular ridge portions are divided into at least a first sector and a second sector which are distributed in an expansion and contraction direction of the bellows such that the second sector is positioned between the first sector and the fixed end, and the outer annular ridge portions included in the first sector have an outer diameter smaller than that of the outer annular ridge portions included in the second sector.

According to the first aspect, in the bellows having received external vibration, by distributing the first sector where the outer diameter of the outer annular ridge portions of the bellows is small in accordance with a sector where amplitude of vibration in a radial direction is locally increased, the bellows can be avoided from abutting on an inner wall surface of the housing, and therefore a service life of the bellows can be prolonged.

The accumulator according to a second aspect of the present invention is characterized in that the first sector is positioned in a center part in the expansion and contraction direction of the bellows.

According to the second aspect, in the bellows having received external vibration, by positioning the first sector in a center part in the expansion and contraction direction of the bellows where amplitude of vibration in the radial direction is locally increased, the bellows can be avoided from abutting on the inner wall surface of the housing, and therefore a service life of the bellows can be prolonged.

The accumulator according to a third aspect, of the present invention is characterized, in that the outer annular ridge portions of the first sector are distributed such that the outer diameter of the outer annular ridge portions of the first sector is gradually decreased toward the center part in the expansion and contraction direction of the bellows.

According to the third aspect, in the bellows having received external vibration, by distributing the first sector where the outer diameter of the outer annular ridge portions of the bellows is smallest in accordance with the center part in the expansion and contraction direction where amplitude of vibration in the radial direction is locally increased, the bellows can be avoided from abutting on the inner wall surface of the housing.

The accumulator according to a fourth aspect is characterized by further comprising, a stay fixed to the housing and provided inside the bellows housed in the housing such that an inside of the bellows is capable of communicating with the fluid supply port, the inner annular ridge portions are divided into at least a third sector and a forth sector which are distributed in the expanding and contraction direction of the bellows such that forth sector is positioned between the third sector and the fixed end, the inner annular ridge portions included in the third sector have an inner diameter larger than that of the inner annular ridge portions included in the fourth sector.

According to the fourth aspect, by distributing the third sector where the inner diameter of the inner annular ridge portions of the bellows is large, the bellows can be avoided from abutting on the stay arranged in the bellows having received external vibration, and therefore a service life of the bellows can be prolonged.

In order to solve the problem, an accumulator according to a fifth aspect of the present invention is an accumulator comprising a bellows having a plurality of outer annular ridge portions and a plurality of inner annular ridge portions and configured to be capable of expanding and contracting, and a housing having a fluid supply port and fixed to one end of the bellows serving as a fixed end, an interior of the housing being partitioned in a sealed state into an inside and an outside of the bellows, and the accumulator is characterized by further comprising a stay fixed to the housing and provided inside the bellows housed in the housing such that an inside of the bellows is capable of communicating with the fluid supply port in the bellows, wherein the inner annular ridge portions are divided into at least a third sector and a fourth sector which are distributed in an expanding and contraction n direction of the bellows such that the forth sector is positioned between the third sector and the fixed end, the inner annular ridge portions included in the third sector have an inner diameter larger than that of the inner annular ridge portions included in the fourth sector.

According to the fifth aspect, by distributing the third sector where the inner diameter of the inner annular ridge portions of the bellows is large, the bellows can be avoided from abutting on the stay arranged in the bellows having received external vibration, and therefore a service life of the bellows can be prolonged.

DESCRIPTION OF EMBODIMENTS

Modes for implementing an accumulator according to the present invention will be described hereinafter based on embodiments.

First Embodiment

An accumulator according to the first embodiment of the present invention will be described with reference to FIG. 1 to FIG. 3. Hereinafter, the near side of the paper plane of FIG. 1 is assumed to be a front face side (front side) of the accumulator, and a description will be made on the basis of the up and down and right and left directions when viewed from the front side.

An accumulator 1 is used, for example, in a hydraulic system for motor vehicle, a hydraulic system for industrial equipment or the like, as a pressure accumulation device, a pulsation damping device or the like, and is a metal bellows accumulator using a metal bellows as a bellows body 31.

Figure 1:
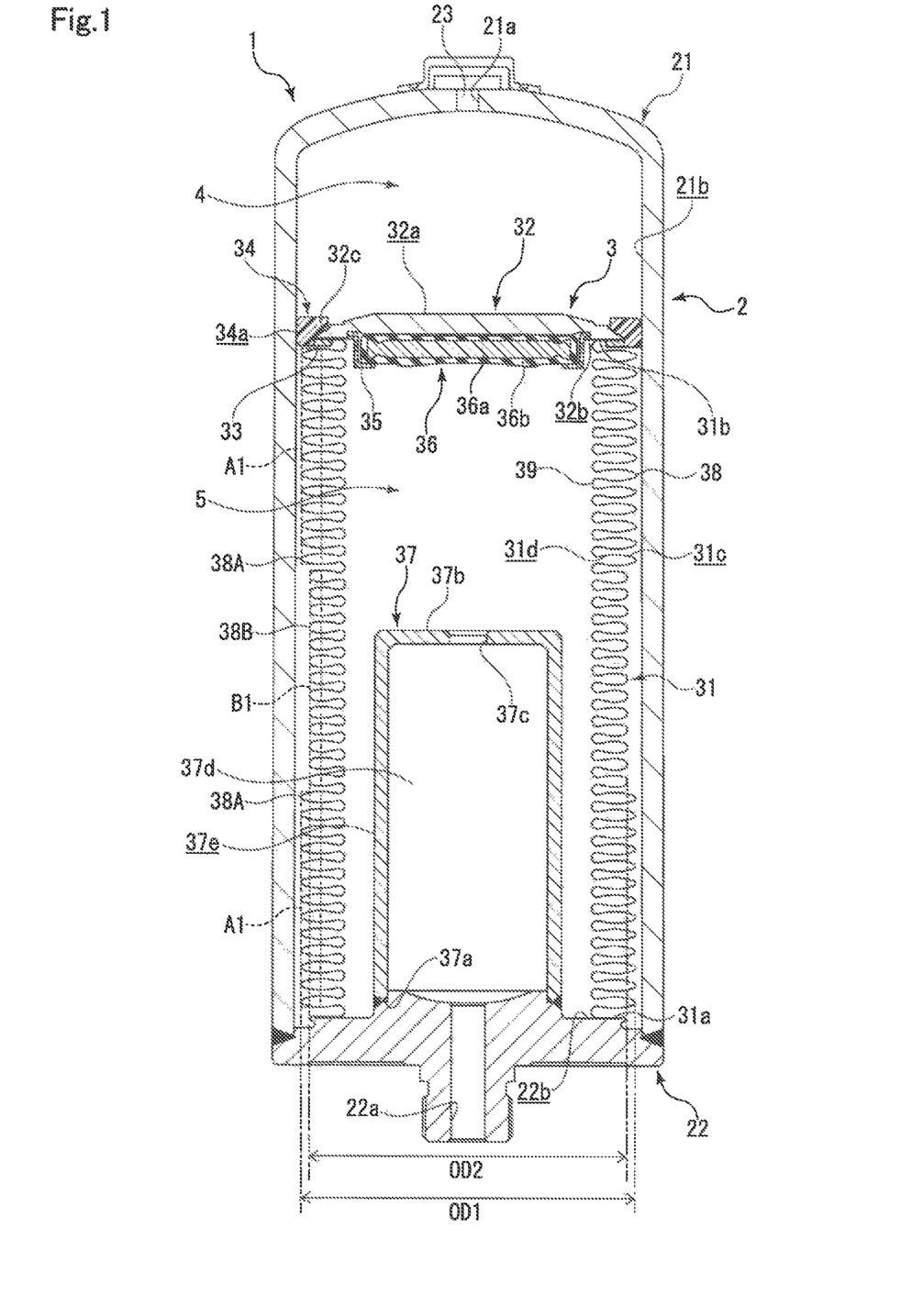
FIG. 1 is a cross-sectional view showing a structure of an accumulator according to a first embodiment of the present invention.

As shown in FIG. 1, the accumulator 1 is comprises of a housing 2 and a bellows 3 housed in the housing 2. In addition, FIG. 1 shows a state that the bellows body 31 (described later) is expanded due to liquid storage or the like.

The housing 2 is provided with a bottomed cylindrical shell 21 whose lower end opens and an oil port member 22 which is welded and fixed thereto so as to close the lower end of the shell 21.

In the upper end of the shell 21, a gas filling port 21a for injecting high pressure gas (for example, nitrogen gas) into a gas chamber 4 (described later) formed in the housing 2 is provided. The gas filling port 21a is closed by a gas plug 23 after injection of high pressure gas.

In the oil port member 22, an oil port 22a for performing inflow and outflow of liquid (for example, hydraulic oil) from a pressure piping (not shown) in the housing 2 is provided.

The bellows 3 is comprises the metallic bellows body 31 forming a generally cylindrical shape whose both upper and lower ends are opened, and a metallic bellows cap 32 forming a disc shape. In addition, a metallic stay 37 forming a bottomed cylindrical shape whose lower end is opened is provided inside the bellows 3 housed in the housing 2.

The bellows body 31 is welded and fixed to an inner surface 22b of the oil port member 22 so as to close a fixed end 31a constituting the lower end thereof, and the bellows cap 32 is welded and fixed thereto in a state that an annular guard ring 33 is sandwiched therebetween so as to close a loose end 31b constituting the upper end thereof.

To an outer peripheral portion 32c of the bellows cap 32, an annular damping ring 34 is attached such that the bellows body 31 and the bellows cap 32 do not directly contact against an inner wall surface 21b of the shell 21. In addition, an outer peripheral surface 34a of the damping ring 34 and the inner wall surface 21b of the shell 21 are slightly spaced in a radial direction, and can smoothly slide without impeding expansion and contraction of the bellows 3.

Moreover, in a lower surface 32b of the bellows cap 32, a gasket holder 35 forming a ring shape in a crank shape viewed from a cross-section is fitted, and a gasket 36 forming a disc shape is attached to the gasket holder 35. The gasket 36 is configured by covering a part or all of a surface of a metal plate 36a forming a disc shape with a rubber-like elastic body 36b.

The stay 37 is provided on the inner side of the bellows body 31, and is welded and fixed to the inner surface 22b of the oil port member 22 so as to close a fixed end 37a constituting the lower end thereof. Moreover, in an end face part 37b constituting an upper end of the stay 37 and forming a disc shape, a liquid inlet and outlet 37c communicating with a hollow part 37d formed in the interior of the stay 37 is provided at the center in the radial direction.

An interior space of the housing 2 is partitioned by the bellows 3 (the bellows body 31 and the bellows cap 32) in a sealed state into a gas chamber 4 communicating with the gas filling port 21a provided in the shell 21, and a liquid chamber 5 communicating with the oil port 22a provided in the oil port member 22 via the hollow part 37d and the liquid inlet and outlet 37c of the stay 37.

The gas chamber 4 is configured by the inner wall surface 21b of the shell 21, the inner surface 22b of the oil port member 22, an outer peripheral surface 31c of the bellows body 31, and an upper surface 32a of the bellows cap 32, and high pressure gas injected through the gas filling port 21a is enclosed therein.

The liquid chamber 5 is configured by the inner surface 22b of the oil port member 22, an inner peripheral surface 31d of the bellows body 31, the lower surface 32b (the gasket 36) of the bellows cap 32, and the end face part. 37b and an outer peripheral surface 37e of the stay 37, and a liquid flows in and out of the pressure piping via the oil port 22a, the hollow part 37d of the stay 37, and the liquid inlet and outlet 37c of the stay 37.

The accumulator 1 performs, by expansion and contraction of the bellows 3 housed in the housing 2, pressure regulation by moving the bellows cap 32 to a predetermined position and balancing gas pressure in the gas chamber 4 and liquid pressure in the liquid chamber 5.

Figure 2:
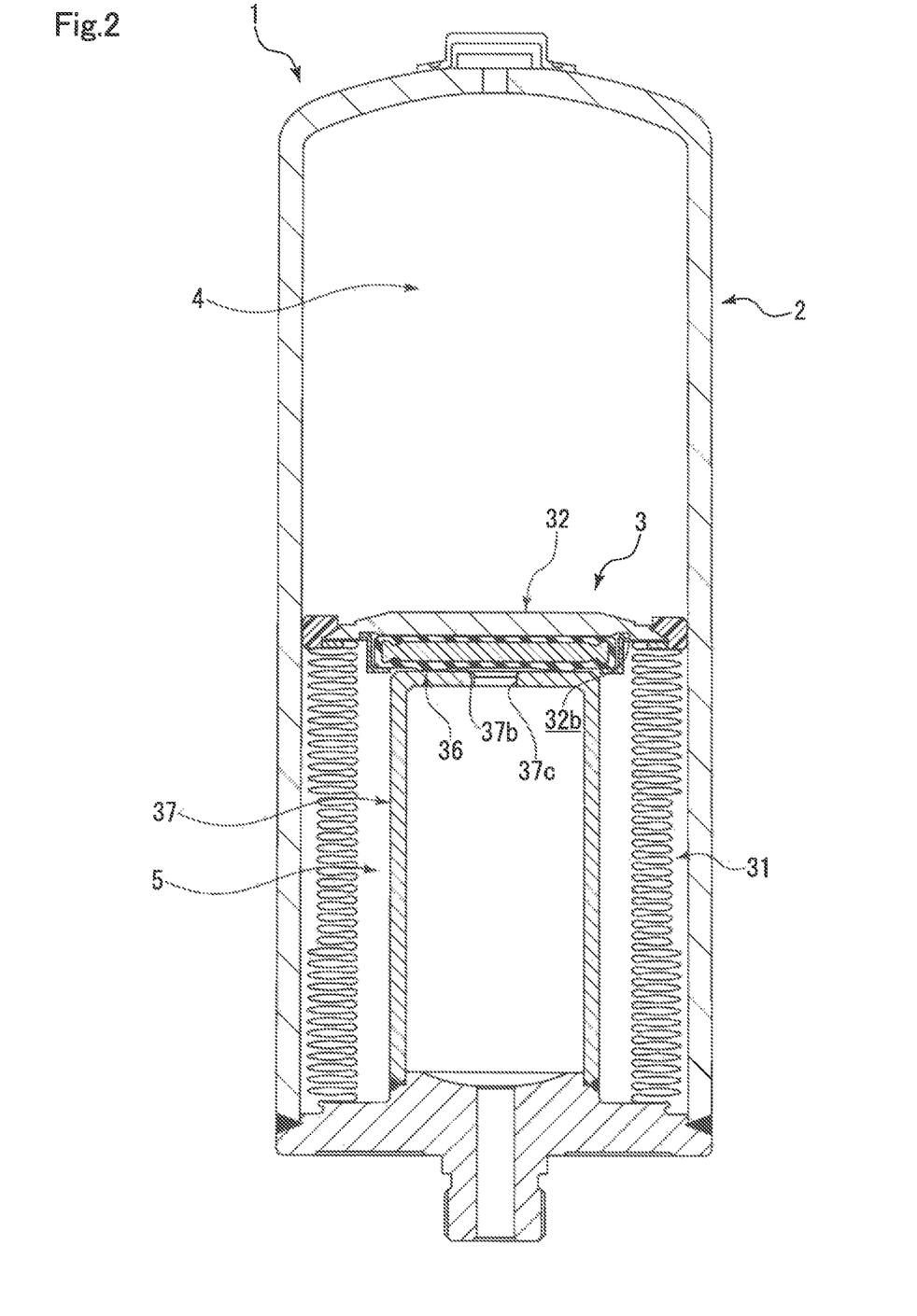
FIG. 2 is a cross-sectional view showing a state that a bellows of the accumulator shown in FIG. 1 is expanded and contracted.
Figure 3:
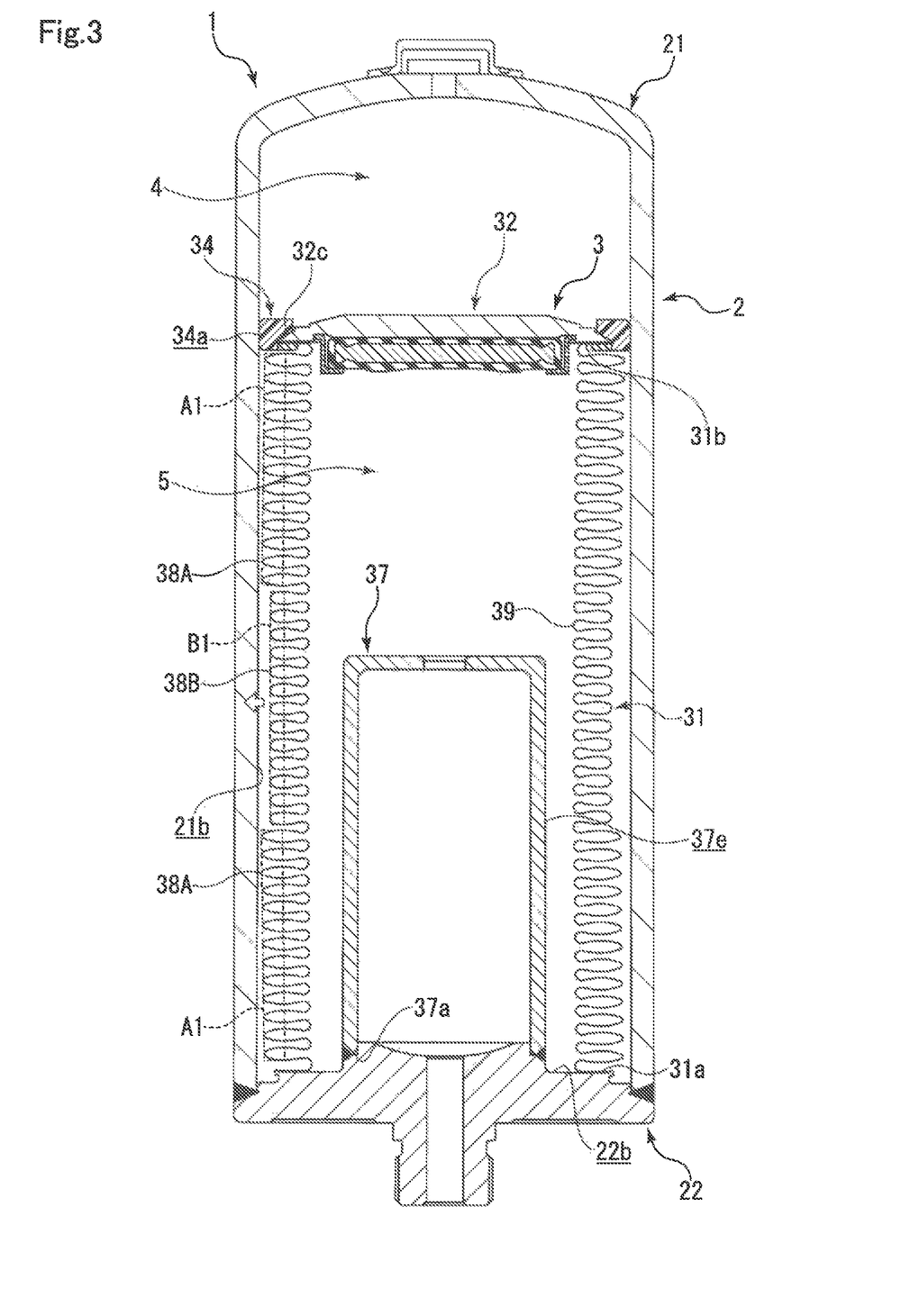
FIG. 3 is a cross-sectional view showing a state that the bellows of the accumulator shown in FIG. 1 vibrates in a radial direction.

For example, as shown in FIG. 2, when the liquid pressure in the liquid chamber 5 is significantly reduced in association with reduction of pressure in the pressure piping, the bellows cap 32 moves downward upon receiving the gas pressure (this pressure is larger than the liquid pressure in the liquid chamber 5) in the gas chamber 4 and the bellows body 31 contracts, and thereby the gasket 36 attached to the lower surface 32b of the bellows cap 32 and the end face part 37b of the stay 37 come into close contact with each other, and then the liquid inlet and outlet 37c is closed. Thereby, a part of liquid is confined within the liquid chamber 5, and pressure of the confined liquid and gas pressure in the gas chamber 4 are balanced, and therefore excessive stress does not act on the bellows body 31 and damage of the bellows body 31 can be suppressed.

Next, the structure of the bellows body 31 will be described in detail. As shown in FIG. 1, the bellows body 31, by constituting a repetitive structure of ridge-folds and valley-folds from a metallic plate material forming a generally cylindrical shape whose both upper and lower ends are opened, has a plurality of outer annular ridge portions 38, 38, . . . which project to the outer side in the radial direction and are continuously formed in the up and down direction (the expansion and contraction direction) and a plurality of inner annular ridge portions 39, 39, . . . which project to the inner side in the radial direction and are continuously formed in the up and down direction. By the repetitive structure of the outer annular ridge portions 38, 38, . . . and the inner annular ridge portions 39, 39, . . . , the bellows body 31 can expand and contract in the up and down direction. In addition, the bellows body 31 is a molded bellows, and the outer annular ridge portions 38, 38, . . . and the inner annular ridge portions 39, 39, . . . each projects generally uniformly in a circumferential direction.

Moreover, as shown in FIG. 1, in the bellows body 31, a region where there are the outer annular ridge portions 38, 38, . . . having a diameter smaller than that of the fixed end 31a side is distributed in a center part in the expansion and contraction direction. In other words, the outer annular ridge portions 38, 38, . . . are divided into a first sector B1 and second sector A1 which are distributed in an expansion and contraction direction of the bellows body 31 such that the second sector A1 is positioned between the first sector A1 and the fixed end 31a, and the outer annular ridge portions 38, 38, . . . included the first sector μl have an outer diameter smaller than the diameter of the outer annular ridge portions 38, 38, . . . included in the second sector A1, that is, an outer diameter OD2 of the bellows body 31 is smaller than an outer diameter OD1 thereof. In addition, the second sector A1 on the loose end 31b side of the bellows body 31 is configured so as to have the same outer diameter OD1 as the fixed end 31a side. Moreover, hereinafter, the outer annular ridge portions 38, 38, . . . constituting the second sector A1 having the outer diameter OD1 of the bellows body 31 and the outer annular ridge portions 38, 38, . . . in the first sector B1 constituting the outer diameter OD2 of the bellows body 31 will be described as outer annular ridge portions 38A, 38A, . . . and outer annular ridge portions 38B, 38B, . . . respectively.

Next, vibration of the bellows 3 housed in the housing 2 when the accumulator 1 receives external vibration will be described in detail.

When the accumulator 1 receives external vibration, the shell 21 and the oil port member 22 constituting the housing 2 and the stay 37 whose fixed end 37a is welded and fixed to the inner surface 22b of the oil port member 22 vibrate integrally with the same period.

Moreover, when the accumulator 1 receives external vibration, since the fixed end 31a of the bellows body 31 housed in the housing 2 is welded and fixed to the inner surface 22b of the oil port member 22 the fixed end 31a vibrates integrally with the same period as the shell 21, the oil port member 22, and the stay 37 as described above.

On the other hand, since the loose end 31b of the bellows body 31 housed in the housing 2 is suppressed from vibrating in the radial direction by the damping ring 34 attached to the bellows cap 32, but is slightly spaced in the radial direction from the outer peripheral surface 34a of the damping ring 34 and the inner wall surface 21b of the shell 21 as previously described, the outer peripheral surface 34a and the inner wall surface 21b repeat abutment while slightly vibrating in the radial direction within the vibrating shell 21, That is, the loose end 31b side of the bellows body 31 vibrates with a period different from the shell 21, the oil port member 22 and the stay 37, and further the fixed end 31a of the bellows body 31.

Therefore, in the bellows body 31, different vibrations in the radial direction with the fixed end 31a and the loose end 31b respectively as a base point are generated at the outer annular ridge portions 38, 38, . . . and the inner annular ridge portions 39, 39, . . . extended in the expansion and contraction direction. At this time, the periods of the respective vibration in the radial direction with the fixed end 31a and the loose end 31b respectively as a base point approach to each other, and therefore, due to resonance, amplitude of vibration in the radial direction is locally increased in the center part in the expansion and contraction direction of the bellows body 31 (see FIG. 3).

In the bellows body 31 of the accumulator 1 of the present embodiment, the diameter of the outer annular ridge portions 38B, 38B, . . . included in the first sector B1 including the center part in the expansion and contraction direction is smaller than the diameter of the outer annular ridge portions 38A, 38A, . . . included in the second sectors A1, A1 on the fixed end 31a side and the loose end 31b side, that is, the outer diameter OD2 of the bellows body 31 is smaller than the outer diameter OD1 thereof. Therefore, as shown in FIG. 3, projecting ends of the outer annular ridge portions 38B, 38B, . . . included in the first sector μl including the center part in the expansion and contraction direction of the bellows body 31 where amplitude of vibration in the radial direction is locally increased are avoided from abutting on the inner wall surface 21b of the shell 21. Accordingly, the first sector µl including the center part in the expansion and contraction direction of the bellows body 31 which conventionally repeatedly abuts on the inner wall surface 21b of the shell 21 because amplitude of vibration in the radial direction is locally large can be avoided from abutting on the inner surface 21b of the shell 21, and therefore a service life of the bellows body 31 can be prolonged.

In addition, in the bellows body 31 which receives external vibration, since the spot where amplitude of vibration is locally increased and the amplitude amount thereof can be predicted by the shape, length, vibration condition and the like of the bellows, only the diameter of the outer annular ridge portions 38, 38, . . . in the spot where abutment needs to be avoided is designed to be small according to the respective conditions, thereby the ratio of a sector where the diameter of the outer annular ridge portions 38, 38, . . . is small can be suppressed to a minimum. The bellows body 31 of the present embodiment is configured such that the ratio of the first sector µl where the outer annular ridge portions 38B, 38B, . . . are distributed is smaller than that of the second sector A1 where the outer annular ridge portions 38A, 38A, . . . are distributed, and increase and decrease of the capacity of the gas chamber 4 and the liquid chamber 5 which are partly configured by the outer peripheral surface 31c or the inner peripheral surface 31d of the bellows body 31 housed in the housing 2 can be suppressed, and therefore an effect on expansion and contraction of the bellows 3 during pressure regulation is reduced.

Moreover, in order to avoid abutment of the bellows body 31, it is not necessary to change the inner diameter of the shell 21, and the like or provide another member, which results in a simple structure, and the accumulator 1 is easy to produce. Further, it is not necessary to separately install an abutment avoidance member or the like housed in the housing 2, so the accumulator 1 is not increased in mass. In addition, the bellows 3 in the present embodiment is effective for the case of a secondary mode in resonance of a cantilever.

Second Embodiment

Next, an accumulator according to a second embodiment will be described with reference to FIG. 4 and FIG. 5. It should be noted that the same components as the components shown in the above embodiment are denoted by the same reference signs, and a repetitive description will be omitted.

Figure 4:
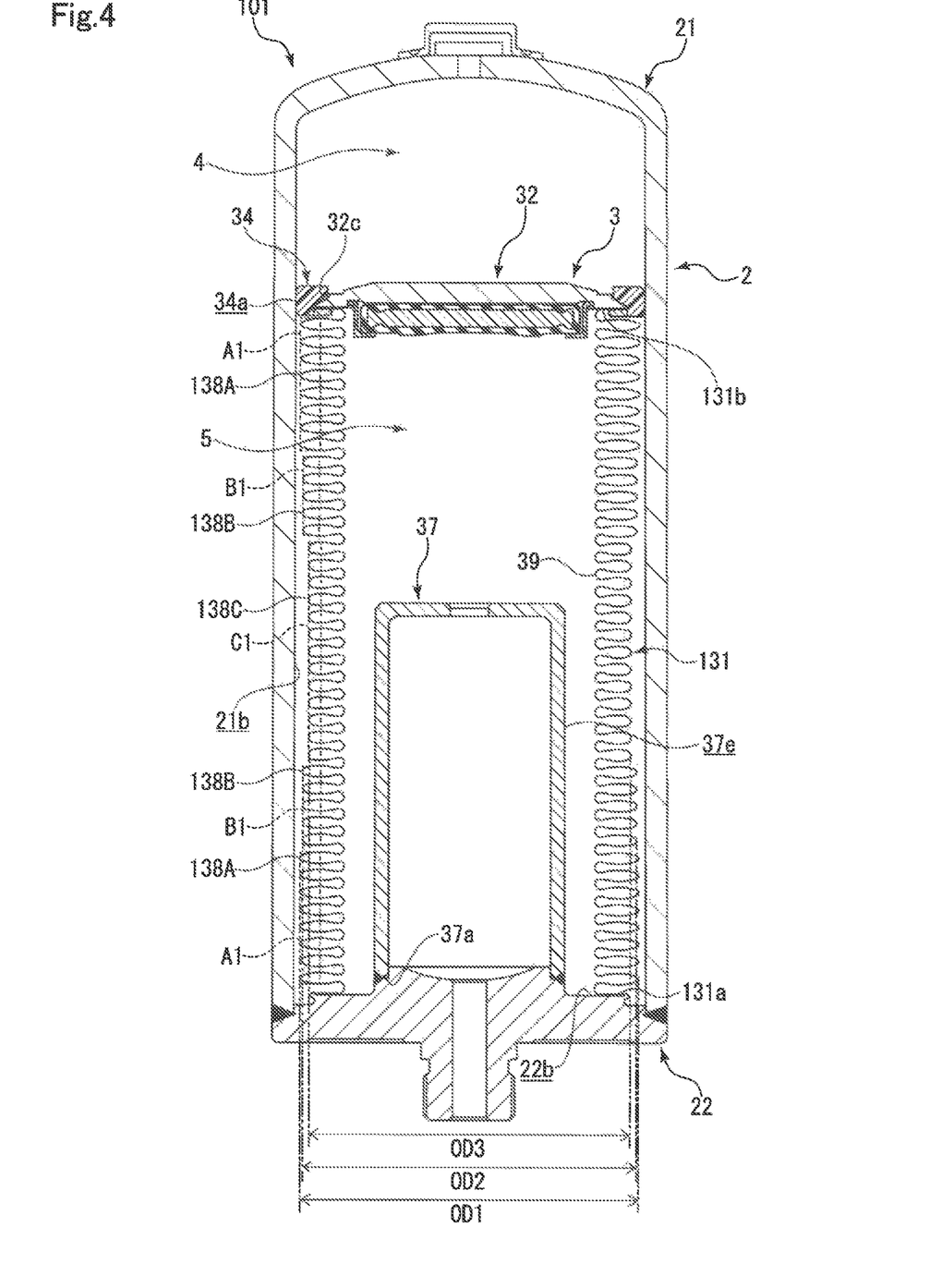
FIG. 4 is a cross-sectional view showing a structure of an accumulator according to a second embodiment of the present invention.

As shown in FIG. 4, a bellows body 131 of an accumulator 101 in the second embodiment is configured such that the diameter of outer annular ridge portions 138B, 138B, . . . and outer annular ridge portions 138C, 138C, . . . included in the first sectors B1, B1 and C1 toward the center part in the expansion and contraction direction is gradually decreased than the diameter of outer annular ridge portions 138A, 138A, . . . included in the second sectors A1, A1 on a fixed end 131a side and a loose end 131b side, that is, the outer diameter OD2 end an outer diameter OD3 of the bellows body 131 are gradually decreased than the outer diameter OD1 thereof.

Figure 5:
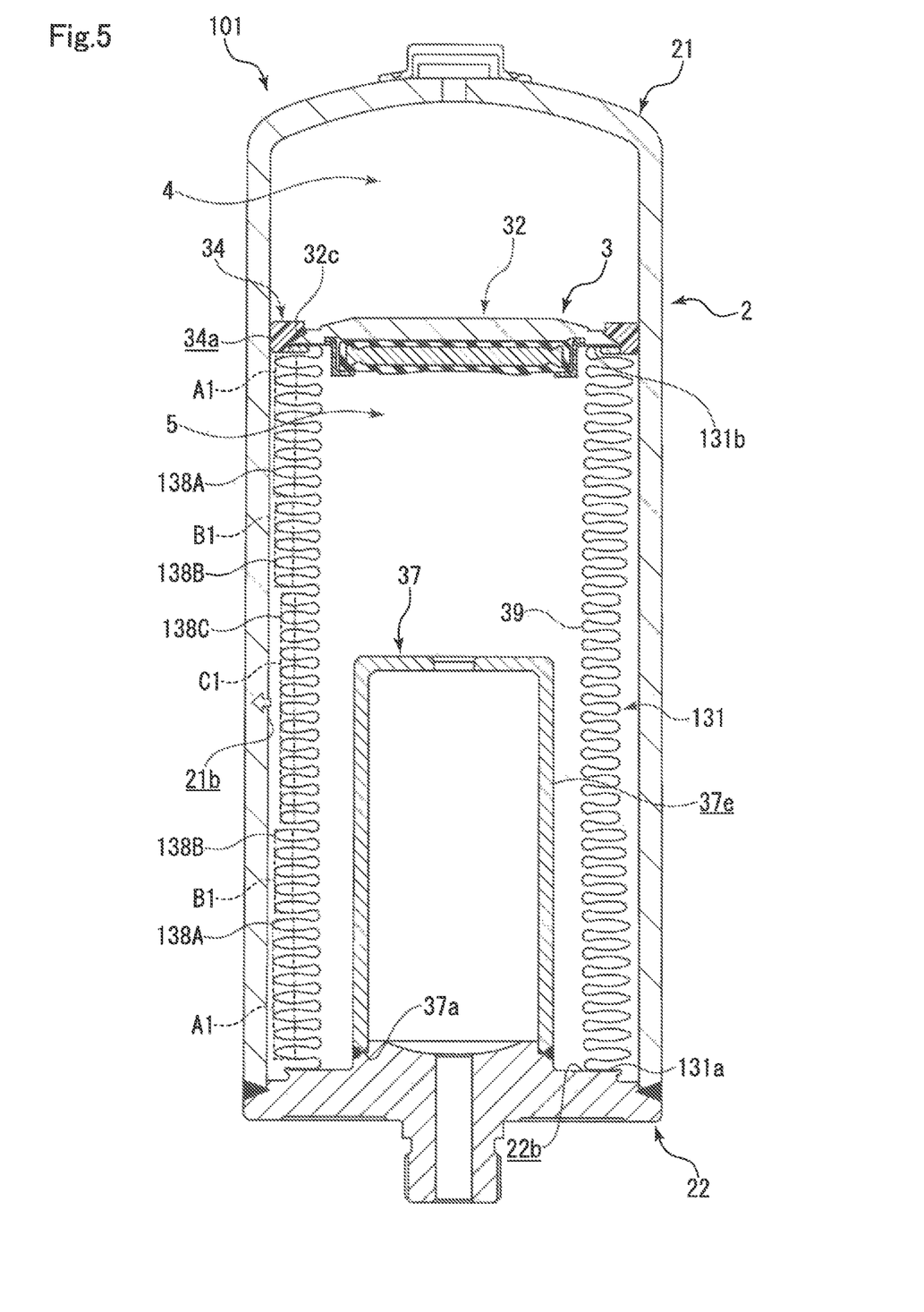
FIG. 5 is a cross-sectional view showing a state that a bellows of the accumulator shown in FIG. 4 vibrates in the radial direction.

Accordingly, as shown in FIG. 5, projecting ends of the outer annular ridge portions 138C, 138C, . . . included in the first sector C1 including the center part in the expansion and contraction direction of the bellows body 131 where amplitude of vibration in the radial direction is largest are avoided from abutting on the inner wall surface 21b of the shell 21. Accordingly, the first sector C1 including the center part in the expansion and contraction direction of the bellows body 131 which conventionally repeatedly abuts the inner wall surface 21b of the shell 21 because amplitude of vibration in the radial direction is locally large can be avoided from abutting on the inner wall surface 21b of the shell 21, and therefore a service life of the bellows body 131 can be prolonged. In addition, the bellows 3 in the present embodiment is effective for the case of a secondary mode in resonance of a cantilever.

Third Embodiment

Next, an accumulator according to a third embodiment will be described with reference to FIG. 6 and FIG. 7. It should be noted that the same components as the components shown in the above embodiments are denoted by the same reference signs, and a repetitive description will be omitted.

Figure 6:
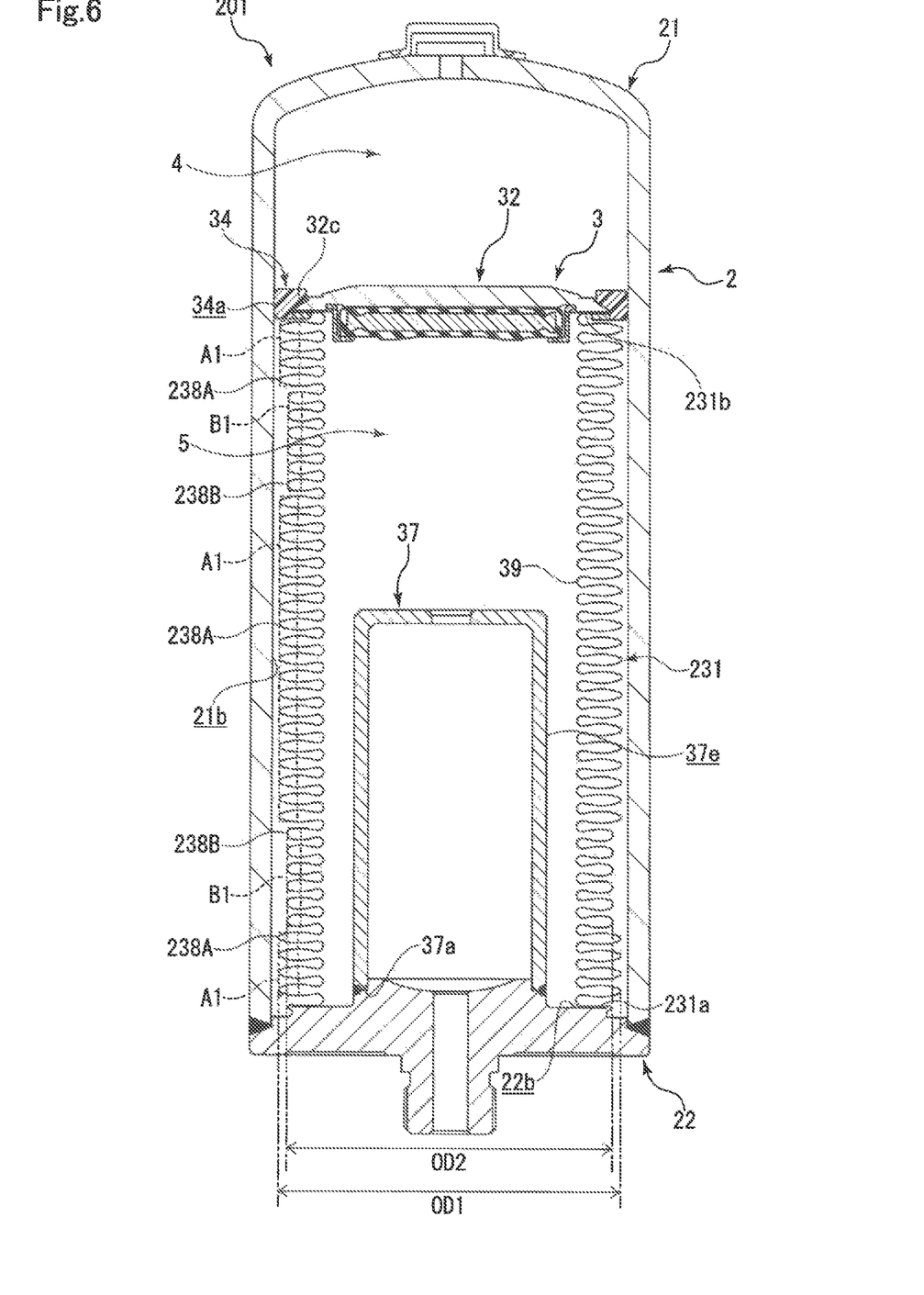
FIG. 6 is a cross-sectional view showing a structure of an accumulator according to a third embodiment of the present invention.

As shown in FIG. 6, in a bellows body 231 of an accumulator 201 in the third embodiment, the first sectors B1, B1 are configured such that the diameter of outer annular ridge portions 238B, 238B, . . . which sandwich the second sector A1 including the center part in the expansion and contraction direction and are divided into upper and lower sectors is smaller than the diameter of outer annular ridge portions 238A, 238A, . . . included in the second sectors A1, A1 on a fixed end 231a side and a loose end 231b side, that is, the outer diameter OD2 of the bellows body 231 is smaller than the outer diameter OD1 thereof. In addition, in the bellows body 231 of the third embodiment, the first sectors B1, B1 where the outer diameter OD2 of the bellows body 231 is small are set by predicting the spot where amplitude amount of vibration is locally increased in accordance with the vibration condition in the radial direction of the bellows body 231 due to external vibration.

Figure 7:
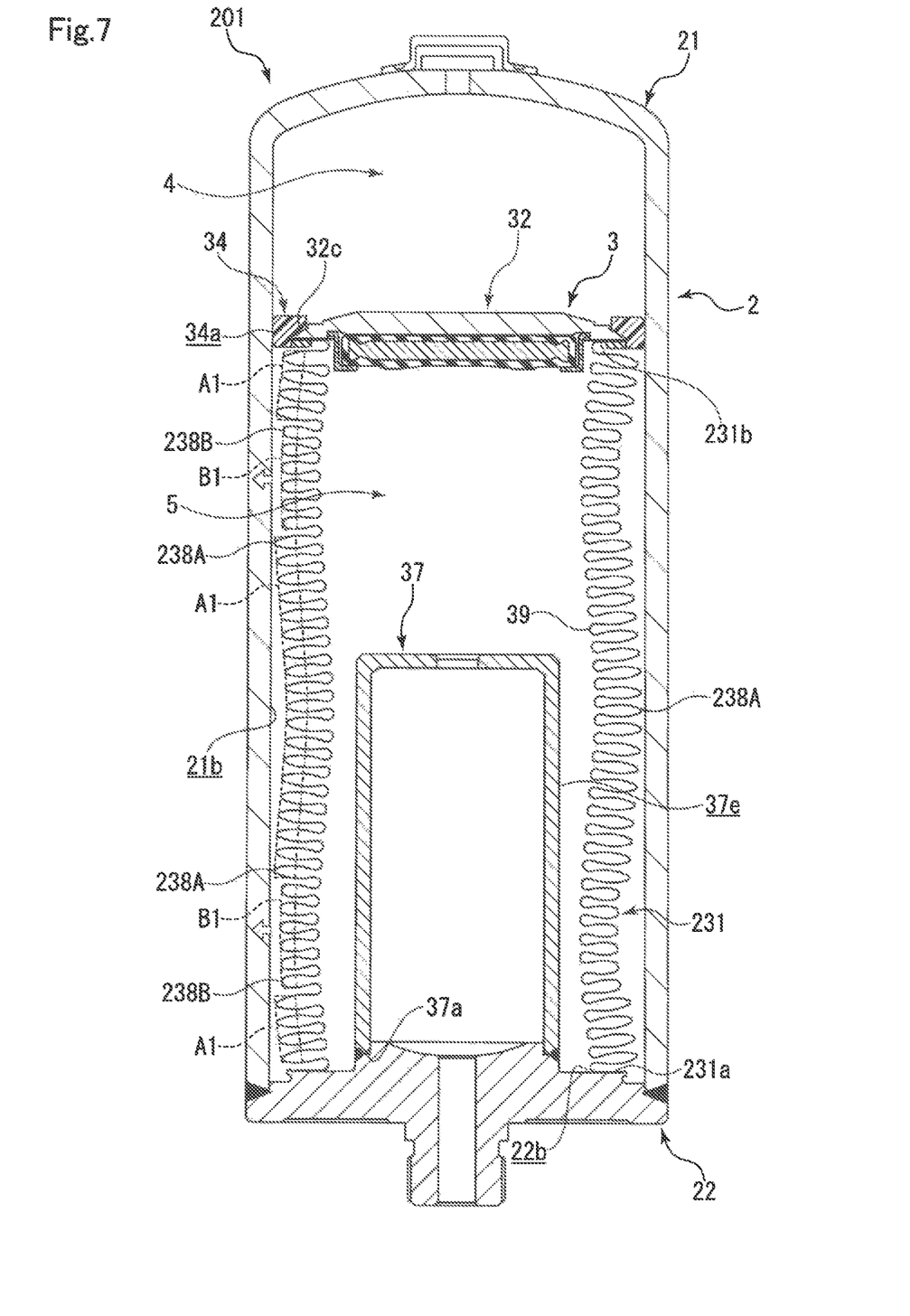
FIG. 7 is a cross-sectional view showing a state that a bellows of the accumulator shown in FIG. 6 vibrates in the radial direction.

Accordingly, as shown in FIG. 7, projecting ends of the outer annular ridge portions 238B, 238B, . . . included in the first sectors B1, B1 of the bellows body 231 in which amplitude of vibration in the radial direction is increased are avoided from abutting on the inner wall surface 21b of the shell 21. Accordingly, in the bellows body 231, the first sectors B1, B1 which are predicted to abut on the inner wall surface 21b of the shell 21 because amplitude of vibration in the radial direction is locally increased can be avoided from abutting on the inner wall surface 21b of the shell 21, and therefore a service life of the bellows body 231 can be prolonged.

Moreover, the bellows body 231 of the present embodiment is configured such that the ratio of the first sector µl where the outer annular ridge portions 238B, 238B, . . . are distributed is smaller than that of the second sector A1 where the outer annular ridge portions 238A, 238A, . . . are distributed, and increase and decrease of the capacity of the gas chamber 4 and the liquid chamber 5 in the housing 2 is suppressed, and therefore an effect on expansion and contraction of the bellows 3 during pressure regulation is reduced. In addition, the bellows 3 in the present embodiment is effective for the case of a tertiary mode in resonance of a cantilever.

Fourth Embodiment

Next, an accumulator according to a fourth embodiment will be described with reference to FIG. 8 and FIG. 9, It should be noted that the same components as the components shown in the above embodiments are denoted by the same reference signs, and a repetitive description will be omitted.

Figure 8:
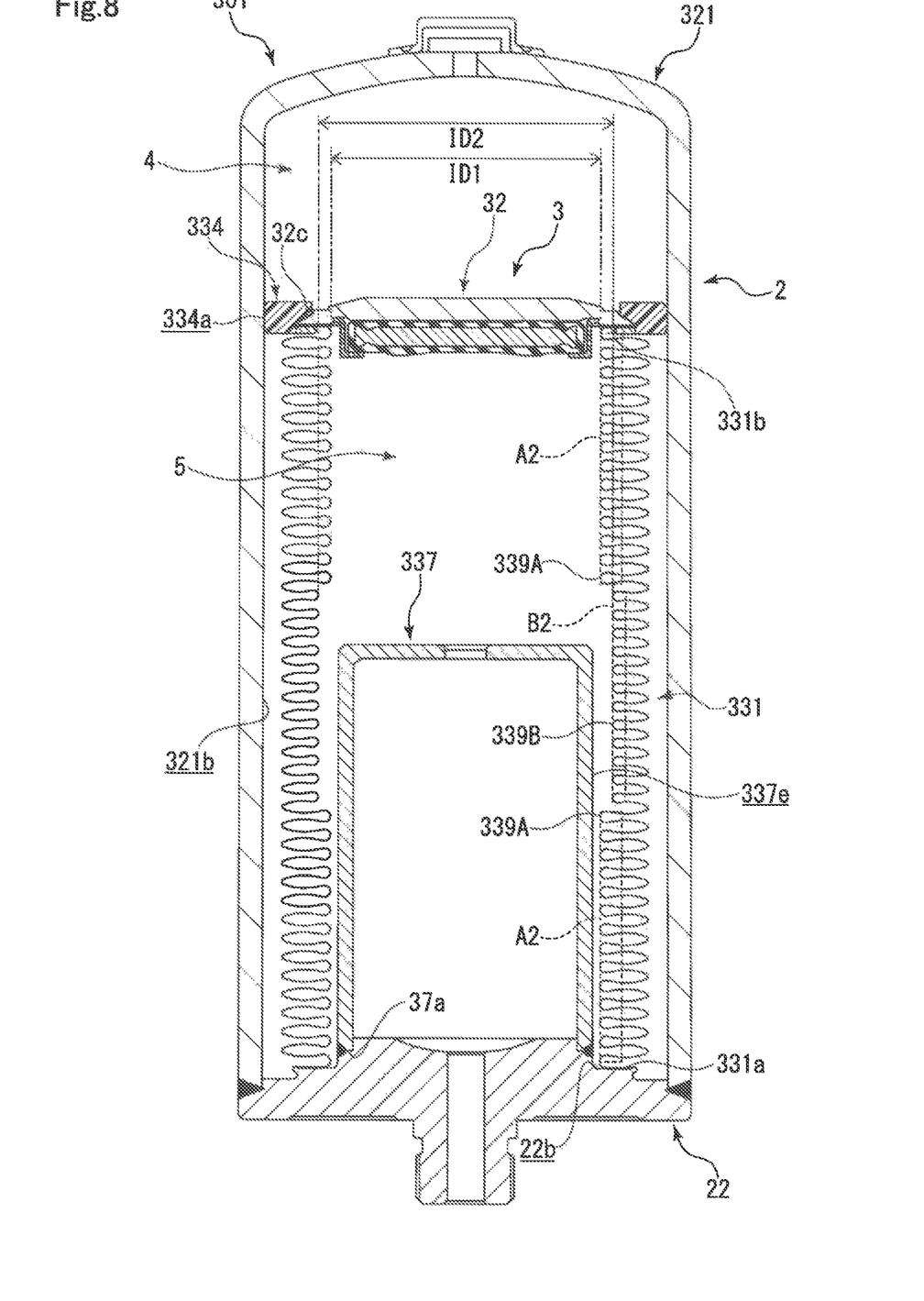
FIG. 8 is a cross-sectional view showing a structure of an accumulator according to a fourth embodiment of the present invention.

As shown in FIG. 8, a bellows body 331 of an accumulator 301 in the fourth embodiment is configured such that the diameter of inner annular ridge portions 339B, 339B, . . . included in a third sector B2 including the center part in the expansion and contraction direction is larger than the diameter of inner annular ridge portions 339A, 339A, . . . included in the fourth sectors A2, A2 on a fixed end 331a side and a loose end 331b side, that is, an inner diameter ID2 of the bellows body 331 is larger than an inner diameter ID1 thereof. In addition, in the accumulator 301, the dimension in the radial direction of a stay 337 provided on an inner side of the bellows body 331 is designed to be large, and an outer peripheral surface 337e of the stay 337 is adjacent in the radial direction to an inner peripheral surface 331d of the bellows body 331. Moreover, in order to space an inner wall surface 321b of a shell 321 and an outer peripheral surface 331c of the bellows body 331 in the radial direction to avoid abutment, the dimension in the radial direction of the shell 321 and a damping ring 334 is designed to be large.

Figure 9:
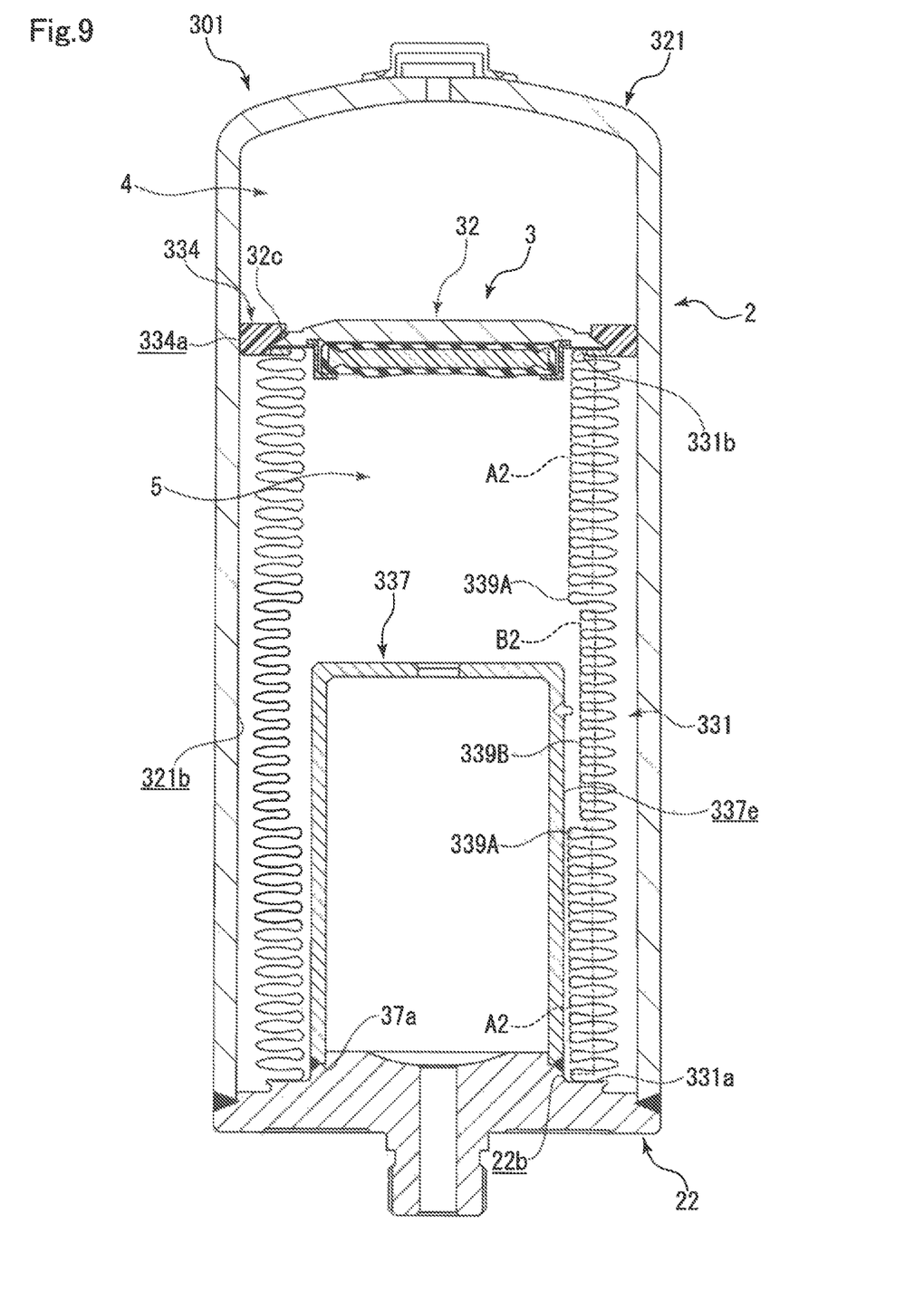
FIG. 9 is a cross-sectional view showing a state that a bellows of the accumulator shown in FIG. 8 vibrates in the radial direction.

Accordingly, as shown in FIG. 9, projecting ends of the inner annular ridge portions 339B, 339B, . . . included in the third sector B2 including the center part in the expansion and contraction direction of the bellows body 331 where amplitude of vibration in the radial direction is locally increased are avoided from abutting on the vicinity of a tip end of the stay 337. Accordingly, the third sector B2 including the center part in the expansion and contraction direction of the bellows body 331 which repeatedly abuts on the vicinity of the tip end of the stay 337 because amplitude of vibration in the radial direction is locally large can be avoided from abutting on the stay, and therefore a service life of the bellows body 331 can be prolonged.

Moreover, the bellows body 331 of the present embodiment is configured such that the ratio of the third sector B2 where the inner annular ridge portions 339B, 339B, . . . are distributed is smaller than that of the second sector A2 where the inner annular ridge portions 339A, 339A, . . . are distributed, and increase and decrease of the capacity of the gas chamber 4 and the liquid chamber 5 in the housing 2 is suppressed, and therefore an effect on expansion and contraction of the bellows 3 during pressure regulation is reduced. In addition, the bellows 3 in the present embodiment is effective for the case of a secondary mode in resonance of a cantilever.

Fifth Embodiment

Next, an accumulator according to a fifth embodiment will be described with reference to FIG. 10 and FIG. 11. It should be noted that the same components as the components shown in the above embodiments are denoted by the same reference signs, and a repetitive description will be omitted.

Figure 10:
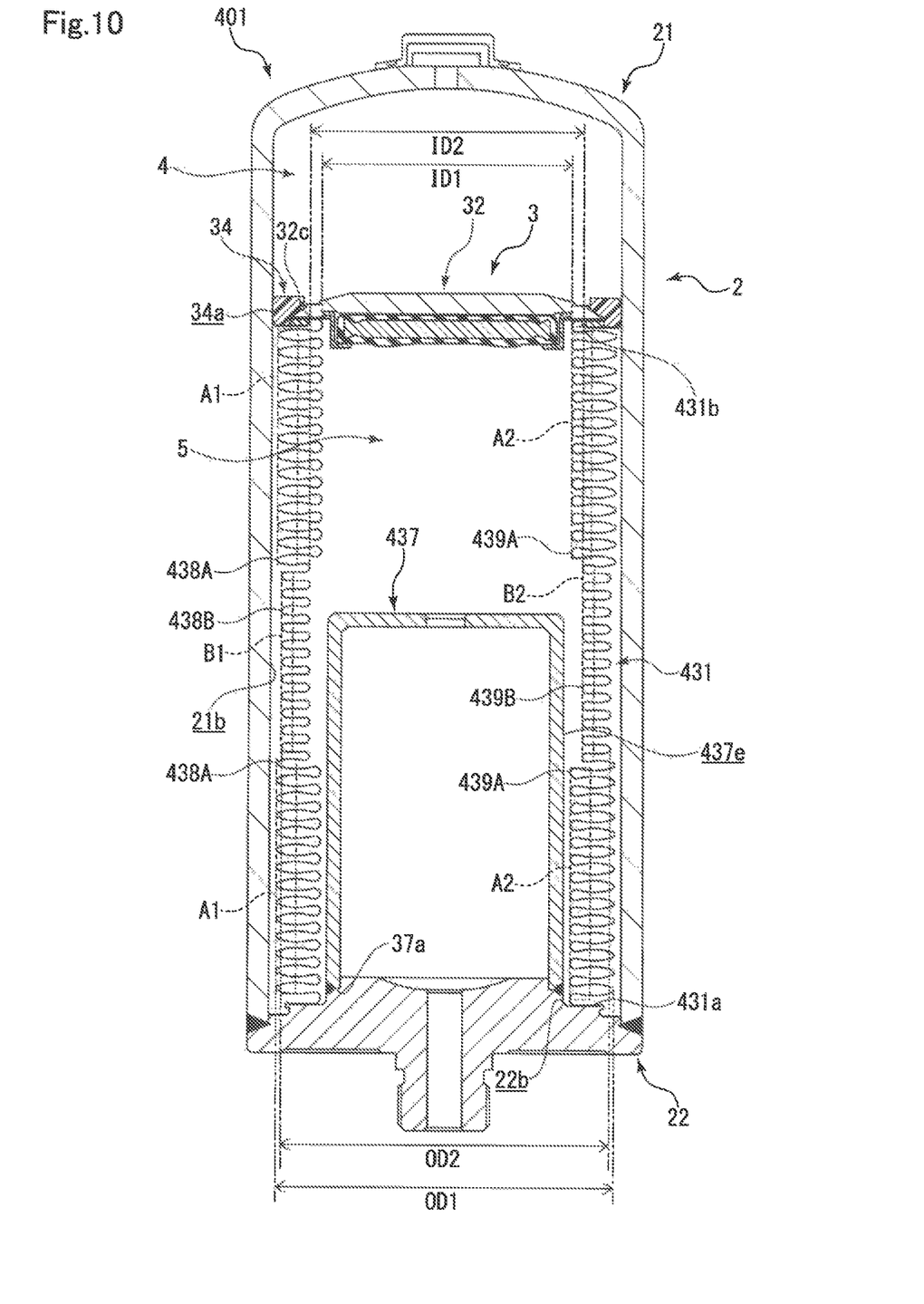
FIG. 10 is a cross-sectional view showing a structure of an accumulator according to a fifth embodiment of the present invention.

As shown in FIG. 10, a bellows body 431 of an accumulator 401 in the fifth embodiment is configured such that the diameter of outer annular ridge portions 438B, 438B, . . . included in the first sector B1 including the center part in the expansion and contraction direction is smaller than the diameter of outer annular ridge portions 438A, 438A, . . . included in the second sectors A1, A1 on a fixed end 431a side and a loose end 431b side, that is, the outer diameter OD2 of the bellows body 431 is smaller than the outer diameter OD1 thereof. Moreover, the bellows body 431 is configured such that the diameter of inner annular ridge portions 439B, 439B, . . . included in the third sector B2 including the center part in the expansion and contraction direction is larger than the diameter of inner annular ridge portions 439A, 439A, . . . included in the second sectors A2, A2 on a fixed end 431a side and a loose end 431b side, that is, the inner diameter ID2 of the bellows body 431 is larger than the inner diameter ID1 thereof. In addition, in the accumulator 401, the dimension in the radial direction of a stay 437 provided on the inner side of the bellows body 431 is designed to be large, and an outer peripheral surface 437e of the stay 437 is adjacent in the radial direction to an inner peripheral surface 431d of the bellows body 431.

Figure 11:
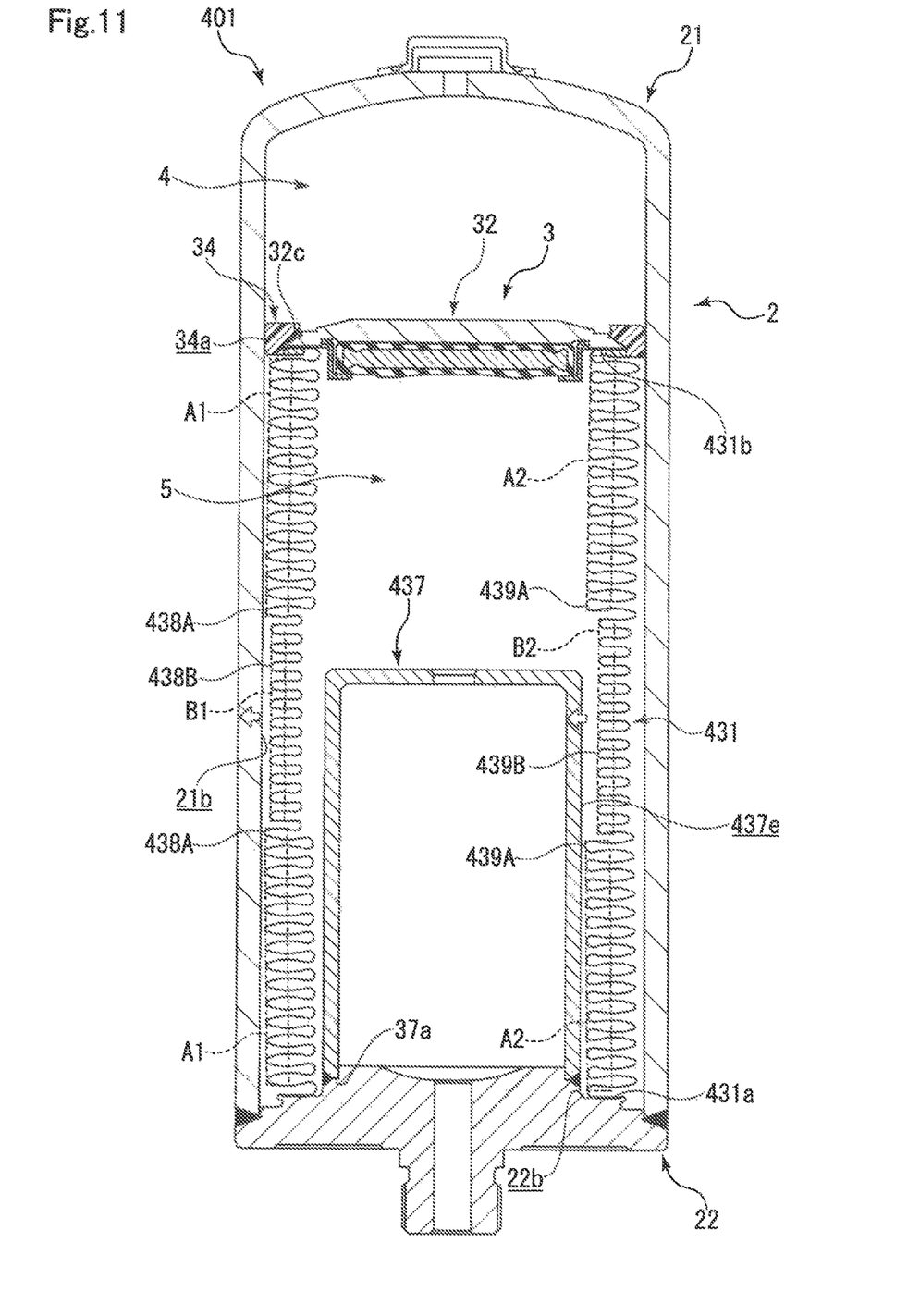
FIG. 11 is a cross-sectional view showing a state that a bellows of the accumulator shown in FIG. 10 vibrates in the radial direction.

Accordingly, as shown in FIG. 11, projecting ends of the outer annular ridge portions 438B, 438B, . . . included in the first sector B1 including the center part in the expansion and contraction direction of the bellows body 431 where amplitude of vibration in the radial direction is locally increased are avoided from abutting on the inner wall surface 21b of the shell 21. Moreover, similarly, projecting ends of the inner annular ridge portions 439B, 439B, . . . included in the third sector 132 including the center part in the expansion and contraction direction of the bellows body 431 are avoided from abutting on the vicinity of a tip end of the stay 437. Accordingly, the first sector B1 and the third sector B2 including the center part in the expansion and contraction direction of the bellows body 431 which repeatedly abuts the inner wall surface 21b of the shell 21 and the vicinity of the tip end of the stay 437 because amplitude of vibration in the radial direction is locally large can be avoided from abutting on the inner wall surface 21b of the shell 21 and the stay 437, and therefore a service life of the bellows body 431 can be prolonged.

Moreover, the bellows body 431 of the present embodiment is configured such that the ratio of the first sector B1 and the third sector B2 where the outer annular ridge portions 438B, 438B, . . . and the inner annular ridge portions 439B, 439B, . . . are distributed is smaller than that of the second sector A1 and the fourth sector A2 where the outer annular ridge portions 438A, 438A, . . . and the inner annular ridge portions 439A, 439A, . . . are distributed, and increase and decrease of the capacity of the gas chamber 4 and the liquid chamber 5 in the housing 2 is suppressed, and therefore an effect on expansion and contraction of the bellows 3 during pressure regulation is reduced in addition, the bellows 3 in the present embodiment is effective for the case of a secondary mode in resonance of a cantilever.

Hereinbefore, although the embodiments of the present invention have been described by the drawings, its specific configuration is not limited to these embodiments, and any changes and additions made without departing from the scope of the present invention are included in the present invention.

For example, in the above embodiments, the accumulators 1, 101, 201, 301, 401 have been described as a so-called outside gas type accumulator in which the gas chamber 4 is set on the outer side of the bellows 3 and the liquid chamber 5 is set on the inner side of the bellows 3, but are not limited thereto, and may be, for example, an inside gas type accumulator in which, by welding and fixing the fixed end of the bellows body to the upper end side of the shell, the gas chamber is set on the inner side of the bellows and the liquid chamber is set on the outer side of the bellows.

Moreover, in the above embodiments, the housing 2 has been described as being provided with the bottomed cylindrical shell 21 and the oil port member 22 which is welded and fixed thereto so as to close the lower end of the shell 21, but is not limited thereto, and the shell and the oil port member may be integrally configured as long as the gas filling port and the oil port are formed in the housing.

Moreover, the above embodiments have been described as the mode in which the gasket 36 is attached to the lower surface 32b of the bellows cap 32 and is brought into close contact with the end face portions 37b, 337b, 437b of the stays 37, 337, 437 during expansion and contraction of the bellows 3, but are not limited thereto, and the gasket may be attached to the end face part of the stay.

In addition, the bellows bodies 31, 231, 331, 431 are not limited to those made of metal, and may be formed of resin or the like, for example.

Moreover, in the above embodiments, the bellows bodies 31, 231, 331, 431 have been described as having the repetitive structure in which one plate material is ridge-folded and valley-folded, but are not limited thereto, and may be configured by welding and fixing inner diameter ends and outer diameter ends of a plurality of ring-shaped discs. Moreover, the ridge-folded and valley-folded portion is not limited to a curved surface, and may be configured in acute angle.

REFERENCE SIGNS LIST

1 Accumulator
2 Housing
3 Bellows
4 Gas chamber
5 Liquid chamber
21 Shell (Housing)
21a Gas filling port
21b Inner wall surface
22 Oil port member (Housing)
22a Oil port
31 Bellows body
31a Fixed end
31b Loose end
32 Bellows cap
34 Damping ring
37 Stay
37c Liquid inlet and outlet
38, 38A, 39B Outer annular ridge portions
39 Inner annular ridge portions
A1, B1 Sector
ID1, ID2 Inner diameter
OD1, OD2 Outer diameter

The invention claimed is:

1. An accumulator comprising: a bellows having a plurality of outer annular ridge portions and a plurality of inner annular ridge portions and configured to be capable of expanding and contracting, and a housing having a fluid supply port and fixed to one end of the bellows serving as a fixed end, the bellows having, in addition to the fixed end, a loose end opposed to the fixed end in an expansion and contraction direction of the bellows, an interior of the housing being partitioned in a sealed state into an inside and an outside of the bellows, wherein:
the outer annular ridge portions are divided into at least a first sector and two second sectors which are distributed in an expansion and contraction direction of the bellows
the outer annular ridge portions included in the first sector have an outer diameter smaller than that of the outer annular ridge portions included in the second sectors, and
the first sector is disposed between the second sectors and occupies a center position between the fixed end and the loose end of the bellows in the expansion and contraction direction.

2. The accumulator according to claim 1, wherein:
the outer annular ridge portions of the first sector are distributed such that the outer diameter of the outer annular ridge portions of the first sector is gradually decreased toward the center position in the expansion and contraction direction of the bellows.

3. The accumulator according to claim 2, further comprising a stay fixed to the housing and provided inside the bellows housed in the housing such that an inside of the bellows is configured to communicate with the fluid supply port, the inner annular ridge portions are divided into at least a third sector and a fourth sector which are distributed in the expanding and contraction direction of the bellows such that the fourth sector is positioned between the third sector and the fixed end, the inner annular ridge portions included in the third sector have an inner diameter larger than that of the inner annular ridge portions included in the fourth sector.

4. The accumulator according to claim 1, further comprising a stay fixed to the housing and provided inside the bellows housed in the housing such that an inside of the bellows is configured to communicate with the fluid supply port, the inner annular ridge portions are divided into at least a third sector and a fourth sector which are distributed in the expanding and contraction direction of the bellows such that the fourth sector is positioned between the third sector and the fixed end, the inner annular ridge portions included in the third sector have an inner diameter larger than that of the inner annular ridge portions included in the fourth sector.

5. An accumulator comprising: a bellows having a plurality of outer annular ridge portions and a plurality of inner annular ridge portions and configured to be capable of expanding and contracting, and a housing having a fluid supply port and fixed to one end of the bellows serving as a fixed end, the bellows having, in addition to the fixed end, a loose end opposed to the fixed end in an expansion and contraction direction of the bellows, an interior of the housing being partitioned in a sealed state into an inside and an outside of the bellows, the accumulator further comprising
a stay fixed to the housing and provided inside the bellows housed in the housing such that an inside of the bellows is configured to communicate with the fluid supply port in the bellows, wherein
the inner annular ridge portions are divided into at least a third sector and two fourth sectors which are distributed in an expanding and contraction direction of the bellows,
the outer annular ridge portions included in the third sector have an outer diameter equal to or smaller than that of the outer annular ridge portions included in the fourth sectors,
the inner annular ridge portions included in the third sector have an inner diameter larger than that of the inner annular ridge portions included in the fourth sectors, and
the third sector is disposed between the fourth sectors and occupies a center position between the fixed end and the loose end of the bellows in the expansion and contraction directions.

* * * * *